Figure 1:
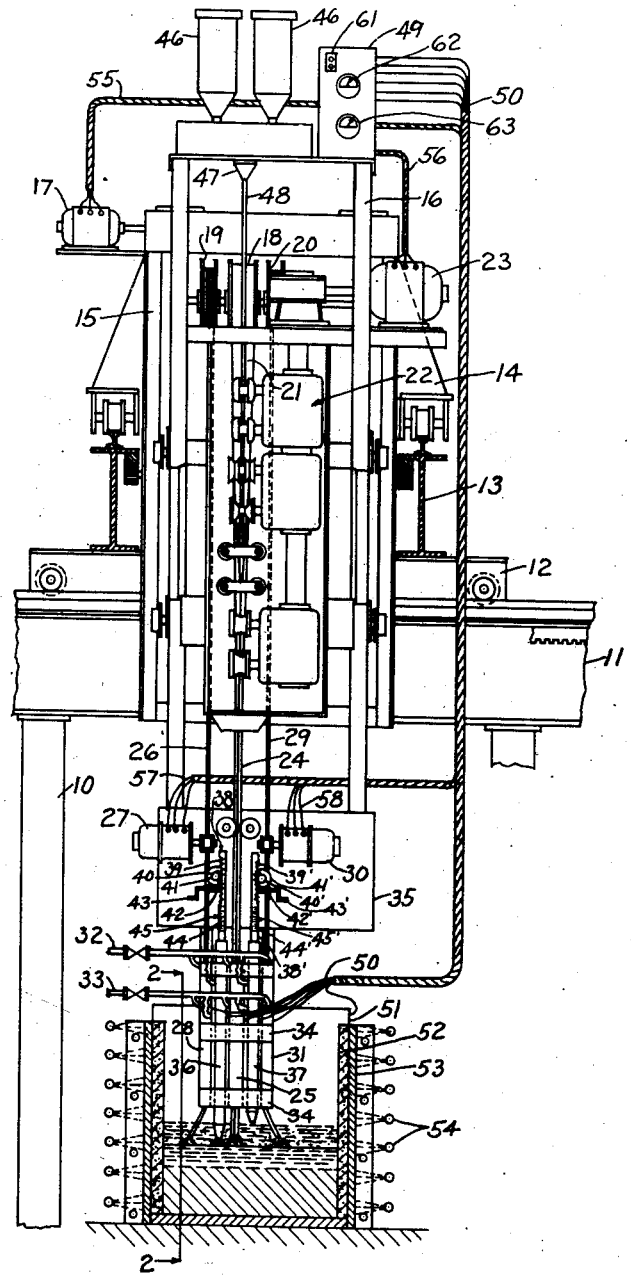

Sept. 29, 1942.   R. K. HOPKINS   2,297,560
APPARATUS FOR PRODUCING METAL BODIES
Filed Nov. 13, 1940   2 Sheets-Sheet 1

ROBERT K. HOPKINS
INVENTOR

BY Virgil F. Davis
ATTORNEY

ROBERT K. HOPKINS.
INVENTOR

Patented Sept. 29, 1942

2,297,560

UNITED STATES PATENT OFFICE 2,297,560

APPARATUS FOR PRODUCING METAL BODIES

Robert K. Hopkins, New York, N. Y., assignor to The M. W. Kellogg Company, New York, N. Y., a corporation of Delaware Application November 13, 1940, Serial No. 365,411

7 Claims. (Cl. 22—58)

This invention relates to the manufacture of metal by the discharge of electric energy, under a blanket of protective flux, and particularly to an improved apparatus useful in such manufacture.

I have heretofore disclosed the production of metal of desired analysis, by fusing and intermingling the constituents thereof under the influence of the discharge of electric current through a gap beneath the surface of a blanket of protective flux, in the manufacture of metal bodies of uniform analysis and in the manufacture of composite bodies made up of base metal armored by an integral coating of metal of special properties.

In the manufacture of metal bodies of uniform analysis, the operation is carried out in a mold by discharging electric current from the end of one or more metal electrodes through a gap or gaps, beneath the surface of a blanket of protective flux contained in the mold. In the manufacture of composite metal bodies the operation is likewise carried out beneath the surface of a blanket of flux in a mold but part or all of the mold surface is defined by the base metal to be coated. In addition to the electrode, or electrodes, primarily employed for fusing constituents of the desired metal one or more surface fusing electrodes are used. These electrodes are directed angularly toward the surface of the base metal in the region of the meeting line of the base metal and the liquid metal produced in the operation to fuse the base metal in this region so that a molten base metal surface is constantly presented to the rising liquid metal and a proper union throughout between the metals is assured.

I have found that the depth of the protective flux blanket is an important factor in these operations and that it must be maintained within rather close limits if predetermined results are to be obtained. With metal molds the variations in the depth of the protective flux blanket during a particular operation are usually small but when non-metallic molds are used the variations are generally sufficient to seriously upset the established conditions.

It is a primary object of this invention to provide a simple and sturdy apparatus arrangement for indicating the depth of the protective flux blanket during the manufacture of metal bodies by the fusion and the intermingling of the constituents of metal thereof under the influence of the discharge of electric current through a gap beneath the surface of the protective flux blanket.

It is a further primary object of the invention to provide, in an apparatus adapted for use in the manufacture of metal bodies by the fusion and interminging of the constituents of metal thereof in a mold under the influence of the discharge of electric current from the end of an electrode through a gap beneath the surface of a protective blanket of flux, a simple and sturdy arrangement for raising the apparatus elements associated with the electrode to maintain a fixed relation between them and the liquid metal level and for indicating the depth of the protective blanket of flux.

Figure 2:
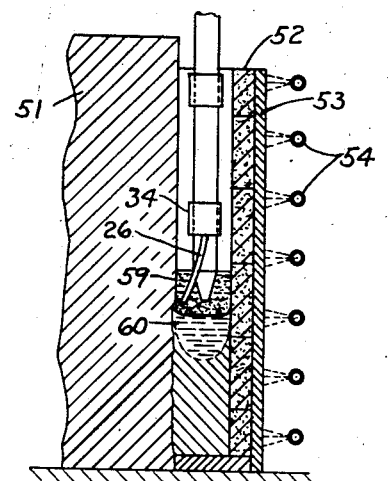
Figure 3:
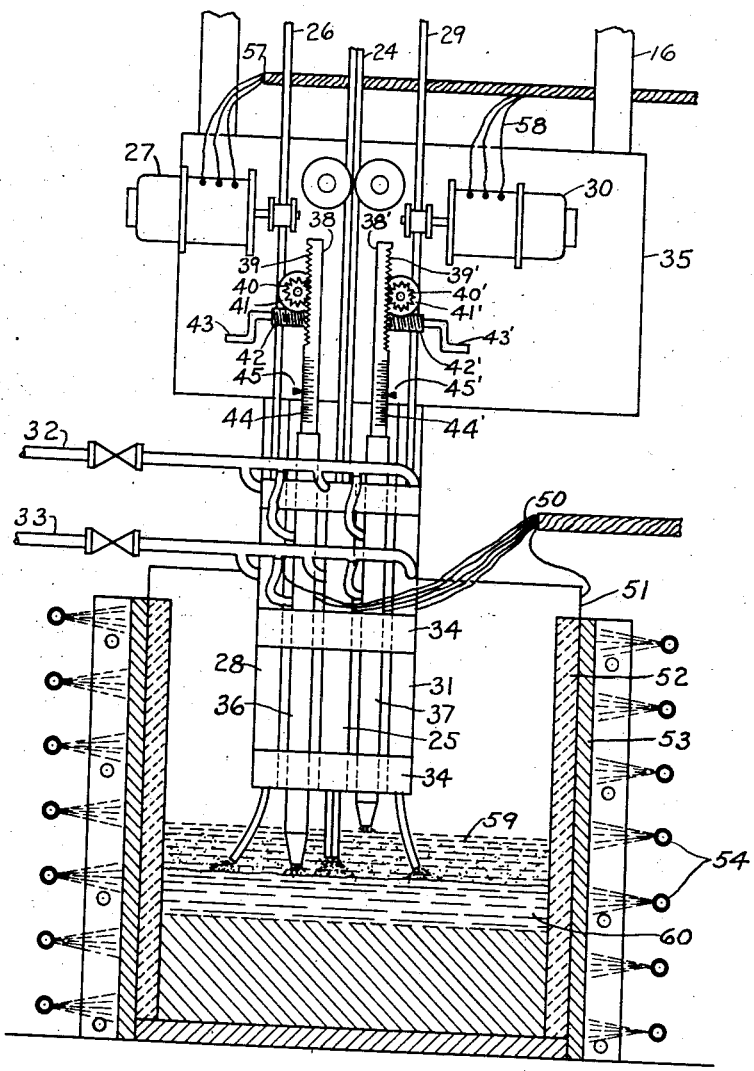

The above as well as the further objects and advantages of the invention will be better understood and appreciated from the following description of the invention taken with the accompanying drawings, in which:

Fig. 1 is a front view, partly in section, of apparatus embodying the invention, Fig. 2 is an enlarged sectional view taken on line 2—2 of Fig. 1, and Fig. 3 is an enlargement of the lower portion of Fig. 1.

The apparatus of the invention is of general application and may be used in the production of bodies, such as ingots, of the same analysis throughout, or it may be used in the production of composite bodies, as as ingots, billets, etc., that are made up of base metal of one analysis to which is integrally united throughout a coating of armoring metal of a different analysis. For the purpose of this application, rather than by way of limitation, the novel apparatus combination will be disclosed in connection with apparatus particularly adapted for the production of composite bodies.

The apparatus shown in the drawings approximates that shown and described in my prior U. S. Patent No. 2,191,481. Since the patent disclosure may be referred to it will not be necessary to describe in detail the portions of the apparatus not included in the present invention. The prior patent also includes a detailed disclosure of the method for forming composite metal bodies so that the method will also not be gone into in detail here.

The apparatus embodying my invention includes a structure 10 upon which bridge 11 is supported. A truck 12 is mounted for back-and-forth movement on bridge 11. Truck 12 carries thereon bridge members 13 upon which a second truck 14 is mounted for back-and-forth movement.

Secured to truck 14 is a depending vertical frame 15 which provides support for the vertically movable frame 16. A screw mechanism, not shown, operated by reversible motor 17 is provided for moving frame 16 up and down. Frame 16 carries strip reel 18 and wire reels 19 and 20. Strip 21 passes through tube forming mechanism 22, which is driven by reversible motor 23, to be formed into hollow electrode 24 and to be fed as such through cooled elongated nozzle 25. Wire 26 is fed from reel 19 by reversible feed motor 27 through cooled elongated contact nozzle 28. Wire 29 is fed from reel 20 by reversible feed motor 30 through cooled elongated contact nozzle 31. Nozzle 25 is provided with a straight bore while the bores of nozzles 28 and 31 are shaped to direct wires 26 and 29 as shown in the drawings.

Nozzles 25, 28 and 31 are provided with water, or other cooling medium, circulating passageways therein. The cooling medium enters the nozzles through connections with valved inlet line 32 and leaves through connections with valved outlet line 33. The nozzles are formed into a unit by metal strips 34; suitable insulation is provided to keep each nozzle electrically separated from the others. The nozzle unit is attached to the bottom cross piece 35 of vertically movable carriage 16 and is movable therewith.

Between nozzles 25 and 28 is mounted for vertical movement a pilot electrode 36; a second pilot electrode 37 is mounted for vertical movement between nozzles 25 and 31. Insulation is provided to electrically isolate the pilot electrodes. The pilot electrodes are also cooled and include circulation passageways therein which are connected through flexible connectors to valved inlet line 32 and valved outlet line 33. The tips of electrodes 36 and 37 should preferably be non-consumable or substantially so. This end is obtained by making the tips of copper and circulating sufficient cooling medium through the passageways of their respective electrodes.

At the top end of electrode 36 is fastened a bar 38 which includes a rack 39. Rack 39 meshes with a wheel 40 that is keyed to a shaft journalled for rotation on cross member 35. To the same shaft is keyed a worm wheel 41 that is driven by worm 42. The drive shaft of worm 42 terminates in a hand crank 43 by the operation of which electrode 36 may be raised or lowered relative to the nozzle unit. The worm and wheel arrangement serves to lock electrode 36 in any position of adjustment. A graduated scale 44 is marked on, or carried by, bar 38. An index 45 is positioned on cross member 35. The scale and index are positioned to indicate the distance that the electrode tip extends below the bottom of the nozzle unit. Pilot electrode 37 includes an identical arrangement, the parts of which are numbered with the primes of the numbers used to designate the corresponding part of the arrangement of electrode 36, for raising and lowering it for locking it in position and for indicating the distance between its tip and the bottom of the nozzle unit.

Above tube forming device 22 is carried a number of metering devices each supplied from its hopper 46 with material in the particle form that is required to produce metal of the desired analysis. The materials after being metered come together in funnel 47 and pass through conduit 48 to enter hollow electrode 24 after it is formed.

A housing 49 is provided, at a location convenient to the operator of the apparatus, which contains the electric current supply connections and the automatic control arrangements necessary for the proper operation of the apparatus. Each of contact nozzle 25, 28 and 31 and pilot electrodes 36 and 37 is connected to an appropriate source of electric current through its one of cables 50. The other side of the electric current source, or sources, is grounded through another of cables 50 connected to metal body 51 which is to be armored with the coating of protective alloy.

Metal 51 is positioned below the nozzle unit and defines one surface of the mold in which the operation is carried out. The other surfaces may be defined by any suitable material such as metal of either high or low heat conductivity, ceramic material, etc.; for the purposes of this disclosure they are shown as defined by ceramic material 52 which is preferably in brick form. The ceramic material is backed up by metal members 53 that may be cooled as by water sprays 54.

Motors 17, 23, 27 and 30 are connected to their control arrangements and current sources through cables 55, 56, 57, and 58 which issue from housing 49. The control arrangements for motor 23 are such as to cause motor 23 to form and feed hollow electrode 24 as required to maintain an electric discharge from its end beneath the surface of flux blanket 59 of substantially constant predetermined characteristics. The control arrangements for motors 27 and 30 are such as to cause these motors to feed their respective electrodes 26 and 29 as required to maintain electric discharges from their ends beneath the surface of flux blanket 59 of substantially constant characteristics. The control arrangements may be of any preferred type capable of producing the results mentioned, in general those used to control the length of the arc in automatic welding heads are suitable.

It is of course evident that unless the nozzle unit is raised with the rising liquid metal 60 the molten flux will ultimately come into contact with the nozzle unit and thereby set up undesirable conditions. Also, it is evident that unless the ends of electrodes 26 and 29 are raised as the level of the liquid metal 60 rises the discharge from the ends of these electrodes will move away from the surface of metal 51 and will no longer be effective to fuse the depth of metal 51 required to assure a complete bond throughout between metal 51 and a coating metal 60 of predetermined analysis.

To accomplish this purpose automatic control arrangements are also provided in the circuit of motor 17. These control arrangements are cut into the current circuit of pilot electrode 36 and control the operation of motor 17 to maintain a discharge from the end of electrode 36 of substantially constant predetermined characteristics so that a constant distance is maintained between the surface of liquid metal 60 and the bottom of the nozzle unit. I find it advantageous also to provide a switch 61 in the circuit of motor 17 so that the operator may at will cut the automatic control arrangements out of the motor circuit and can manually control the operation of the motor.

The operation is begun with pilot electrode 36 retracted from its operating position, as initially there is no liquid metal, and the operator raises the nozzle unit at a rate found proper from experience. After sufficient liquid metal is present pilot electrode 36 is moved in its operating position and the operator controls the operation of motor 17 as required to maintain a predetermined voltage reading at volt meter 62, which is in the circuit of pilot electrode 36. When the operation is sufficiently stabilized the automatic control arrangements are cut in.

Pilot electrode 37 is also retracted from its operating position at the beginning of the operation as ordinarily molten flux is not then present. When the flux blanket is molten pilot electrode 37 is moved to its operating position. Pilot electrode 37 is so positioned in operation that when an electrical discharge of predetermined characteristics is struck off its tip the ends of wire electrodes 26 and 29 will be in the position for these electrodes to fuse the surface of metal 51 to the desired depth. The distance between the bottom of the nozzle unit and the surface of the molten metal 60 less the width of the discharge gap will be indicated on scale 44 opposite index 45. Since the thickness of the desired flux blanket 59 is known pilot electrode 37 is brought to its operating position when its index 45' points on scale 44' the reading on scale 44 less the desired blanket depth.

During the operation if the depth of flux blanket 59 becomes less than the predetermined depth the flow of current between pilot electrode 37 and flux 59 is interrupted and voltmeter 63 will indicate the open circuit voltage of electrode 37. The operator will thus be warned that flux must be added until the predetermined reading on voltmeter 63 is reestablished. When the depth of flux blanket 59 increases above the predetermined depth voltmeter 63 will indicate a voltage less than the predetermined value and the operator is warned that flux must be removed until the predetermined depth is again established.

The depth of the flux blanket 59 can also be indicated by raising the nozzle unit to maintain a substantially constant distance between its bottom and the surface of flux blanket 59. In this case the arc control arrangements are omitted from the circuit of pilot electrode 36 and are placed instead in the circuit of pilot electrode 37. Switch 61 will now be arranged to cut the arc control arrangements out of the circuit of pilot electrode 37.

When operating with the apparatus arranged as just described, the arc control arrangements are adjusted to control the operation of motor 17 so as to raise the nozzle unit as required to maintain an electric discharge through a gap between the end of pilot electrode 37 and the surface of flux blanket 59 of substantially constant characteristics. Thus, a substantially constant distance between the surface of flux blanket 59 and the bottom of the nozzle unit is maintained. Pilot electrode 36 is initially lowered until its discharge end contacts the surface of molten metal 60, at this time meter 62 will indicate zero voltage and the depth of the flux blanket will be indicated on scale 44 opposite index 45. If the depth of the flux blanket 59 increases meter 62 will indicate the increase by indicating a greater than zero voltage. The operator will reestablish the predetermined depth of flux by bailing flux out of the mold until a zero reading at meter 62 is again obtained.

This arrangement will not however automatically indicate a reduction in flux depth for when the end of pilot electrode 36 moves down into the molten metal 60 the voltage reading at meter 62 will remain at zero. The operator will, therefore, in operations wherein a loss of flux is possible, periodically retract pilot electrode 36 and notice the point on scale 44 at which meter 62 indicates a voltage greater than zero. The difference between this reading on scale 44 and the predetermined setting represents the loss of flux. When a loss of flux is indicated the operator will add flux until zero reading at meter 62 is again obtained at the predetermined setting.

I claim:

1. In metal producing apparatus adapted to provide a rising surface of liquid metal beneath a blanket of protective flux, a vertically movable member, means including motor means adapted to move said member, electrode contact means movable with said member, means connecting said contact means to current supply means, means for feeding an electrode through said contact means to maintain an electrical discharge of predetermined characteristics from its end beneath the surface of the blanket of flux, a substantially non-consumable electrode movable with said electrode contact means and adapted to discharge electric current through a gap beneath the surface of the flux blanket between its end and the rising liquid metal surface, means connecting said substantially non-consumable electrode to current supply means, means connected to the electric circuit of said substantially non-consumable electrode adapted to control said motor means to move said member as required to maintain a discharge of predetermined characteristics from the end of said substantially non-consumable electrode, a second substantially non-consumable electrode movable with said electrode contact means positioned to discharge electric current through a gap between its end and the surface of the flux blanket when the flux blanket is of a predetermined depth, means connecting said second substantially non-consumable electrode to one side of an electric current source, means connecting the flux blanket to the other side of said electric current source, and means for indicating characteristics of the energy circuit formed by said electric current source, said second substantially non-consumable electrode and the flux blanket.

2. In metal producing apparatus adapted to provide a rising surface of liquid metal beneath the surface of a liquid blanket of protective flux, a vertically movable member, means including motor means adapted to move said member, electrode contact means movable with said member, means connecting said contact means to current supply means, means for feeding an electrode through said contact means to maintain an electrical discharge of predetermined characteristics from its end beneath the surface of the blanket of flux, a substantially non-consumable electrode movable with said electrode contact means and adapted to discharge electric current through a gap between its end and the liquid flux surface, means connecting said substantially non-consumable electrode to current supply means, means connected to the electric circuit of said substantially non-consumable electrode adapted to control said motor means to move said member as required to maintain a discharge of predetermined characteristics from the end of said substantially non-consumable electrode, a second substantially non-consumable electrode movable with said electrode contact means positioned to discharge electric current through a gap between its end and the liquid metal surface, means connecting said second substantially non-consumable electrode to one side of an electric current source, means connecting the liquid metal to the other side of said electric current source, and means for indicating characteristics of the energy circuit formed by said electric current source, said second substantially non-consumable electrode and the liquid metal.

3. In metal producing apparatus, a vertically movable member including electrode contact means, a pair of substantially non-consumable electrodes movable with said member and supported for individual movement relative to said member, means for adjustably positioning the ends of each of said electrodes relative to a datum established on said member, means for indicating the distance that each electrode end extends from said established datum, an electric current source for each of said electrodes, means connecting each of said electrodes to its respective current source, means adapted to connect the current sources to a workpiece, and means in the electrical circuit of each of said electrodes adapted to indicate electrical characteristics of said circuits.

4. In metal producing apparatus adapted to provide a body of molten metal whose top surface is covered by a depth of molten flux, the level of the molten metal being subject to variation, a substantially non-consumable electrode adapted to discharge electric current through a gap between its end and the surface of said flux, an electric circuit including said non-consumable electrode and said flux, means for indicating characteristics of said electric circuit, and means for maintaining a predetermined distance between the discharge end of said non-consumable electrode and the level of the molten metal.

5. In metal producing apparatus adapted to provide a body of molten metal whose top surface is covered by a depth of molten flux, the level of the molten metal being subject to variation, a substantially non-consumable electrode adapted to discharge electric current through a gap between its end and the surface of said flux, an electric circuit including said non-consumable electrode and said flux, means for indicating characteristics of said electric circuit, means for indicating variations in the level of the molten metal, and means for adjusting the vertical position of said electrode to maintain a predetermined distance between its discharge end and the level of the molten metal.

6. In metal treating apparatus in which a depth of molten flux is maintained on a body of molten metal, a substantially non-consumable electrode adapted to discharge electric current through a gap between its end and the surface of the molten metal, an electric current circuit including said non-consumable electrode and said metal body, means for indicating characteristics of said circuit, a second substantially non-consumable electrode adapted to discharge electric current through a gap between its end and the surface of the molten flux, a second electric current circuit including said second non-consumable electrode and said flux, and means for indicating characteristics of said second circuit.

7. In metal treating apparatus in which a depth of molten flux is maintained on a body of molten metal, a substantially non-consumable electrode adapted to discharge electric current through a gap between its end and the surface of the molten metal, an electric current circuit including said non-consumable electrode and said metal body, means for indicating characteristics of said circuit, a second substantially non-consumable electrode adapted to discharge electric current through a gap between its end and the surface of the molten flux, a second electric current circuit including said second non-consumable electrode and said flux, means for indicating characteristics of said second circuit, and means for vertically adjusting the vertical spacing of the discharge ends of said non-consumable electrodes.

ROBERT K. HOPKINS.

CERTIFICATE OF CORRECTION.

Patent No. 2,297,560. September 29, 1942.

ROBERT K. HOPKINS.

It is hereby certified that error appears in the printed specification of the above numbered patent requiring correction as follows: Page 1, second column, line 26, for "as as" read --such as--; page 2, second column, line 72, for "in its" read --to its--; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.